United States Patent [19]
Cloutier et al.

[11] Patent Number: 5,752,085
[45] Date of Patent: May 12, 1998

[54] RENTAL CAMERA WITH KEY-OPENING LOCK TO DETER CUSTOMER REUSE AFTER COMPLETED EXPOSURE

[75] Inventors: Robert P. Cloutier; Ronald H. Kiesow, both of Spencerport; Stephen G. Malloy Desormeaux, Rochester, all of N.Y.

[73] Assignee: Eastman Kodak Company, Rochester, N.Y.

[21] Appl. No.: 802,075

[22] Filed: Feb. 4, 1997

[51] Int. Cl.⁶ .................................................. G03B 17/02
[52] U.S. Cl. .............................. 396/6; 396/538; 396/539
[58] Field of Search ............................... 396/6, 535, 536, 396/537, 538, 539

[56] References Cited

U.S. PATENT DOCUMENTS

| | | | |
|---|---|---|---|
| 479,587 | 7/1892 | Fay et al. | 354/281 |
| 5,550,608 | 8/1996 | Smart et al. | 396/538 |
| 5,619,298 | 4/1997 | Stiehler | 396/538 X |

Primary Examiner—Howard B. Blankenship
Attorney, Agent, or Firm—Roger A. Fields

[57] ABSTRACT

A rental camera is to be used by a customer for picture-taking and is intended to be returned to a lender to unload exposed film and replace with fresh film. The rental camera comprises a camera body having an exterior-to-interior through-hole; and operable means supported within the camera body for movement between a first position for deterring unloading exposed film and replacing with fresh film and a second position for not deterring unloading exposed film and replacing with fresh film, and having an engageable portion accessible via the through-hole when the operable means is in the first position for an auxiliary key to engage to move the operable means to the second position when the auxiliary key is rotated.

5 Claims, 7 Drawing Sheets

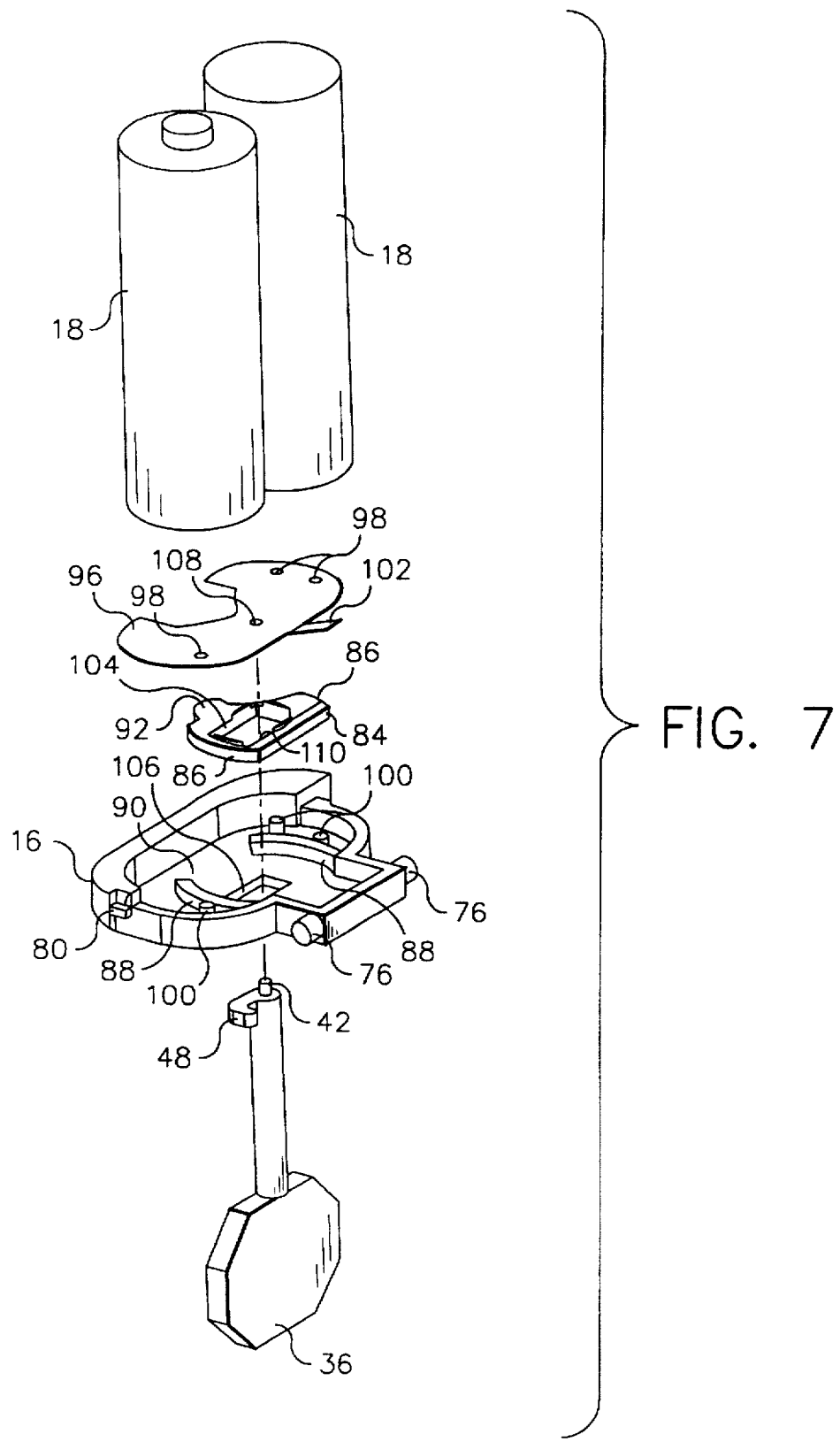

RENTAL CAMERA WITH KEY-OPENING LOCK TO DETER CUSTOMER REUSE AFTER COMPLETED EXPOSURE

CROSS-REFERENCE TO RELATED APPLICATION

Reference is made to commonly assigned copending application Serial No. 08/795,172, entitled RENTAL CAMERA WITH LOCKING DEVICE TO DETER CUSTOMER REUSE AFTER COMPLETED EXPOSURE and filed Feb. 4, 1997 in the name of Robert P. Cloutier.

FIELD OF THE INVENTION

The invention relates generally to the field of photography, and in particular to rental cameras. More specifically, the invention relates to a rental camera with a key-opening lock to deter customer reuse after completed exposure.

BACKGROUND OF THE INVENTION

It is proposed that one of the deciding factors for the success of a camera rental business is to deter the customer from removing the exposed film from a rented camera and reloading fresh film into the rented camera. This responsibility preferably should be left to the lender of the rental camera.

SUMMARY OF THE INVENTION

According to one aspect of the invention, there is provided a rental camera to be used by a customer for picture-taking and intended to be returned to a lender to unload exposed film and replace with fresh film. The rental camera comprises:

a camera body having an exterior-to-interior through-hole; and operable means supported within the camera body for movement between a first position for deterring unloading exposed film and replacing with fresh film and a second position for not deterring unloading exposed film and replacing with fresh film, and having an engageable portion accessible via the through-hole when the operable means is in the first position for an auxiliary key to engage to move the operable means to the second position when the auxiliary key is rotated.

According to another aspect of the invention, there is provided a method of readying a rental camera for a lender to unload exposed film and replace with fresh film. The method comprising the steps of:

inserting an auxiliary key through a through-hole in the camera body and into engagement with a movable member supported within the camera body for movement between a first position for deterring unloading exposed film and replacing with fresh film and a second position for not deterring unloading exposed film and replacing with fresh film; and rotating the auxiliary key in engagement with the movable member when the movable member is in the first position to move the movable member to the second position to permit the lender to unload exposed film and replace with fresh film.

BRIEF DESCRIPTION OF THE DRAWINGS

FIGS. 6 and 7 are exploded perspective views of a battery door locking mechanism of the rental camera and an auxiliary key for operating the battery door locking mechanism;

DETAILED DESCRIPTION OF THE INVENTION

The invention is disclosed as being embodied preferably in a still-picture camera. Because the features of a still-picture camera are generally known, the description which follows is directed in particular only to those elements forming part of or cooperating directly with the disclosed embodiment. It is to be understood, however, that other elements may take various forms known to a person of ordinary skill in the art.

Figure 1:
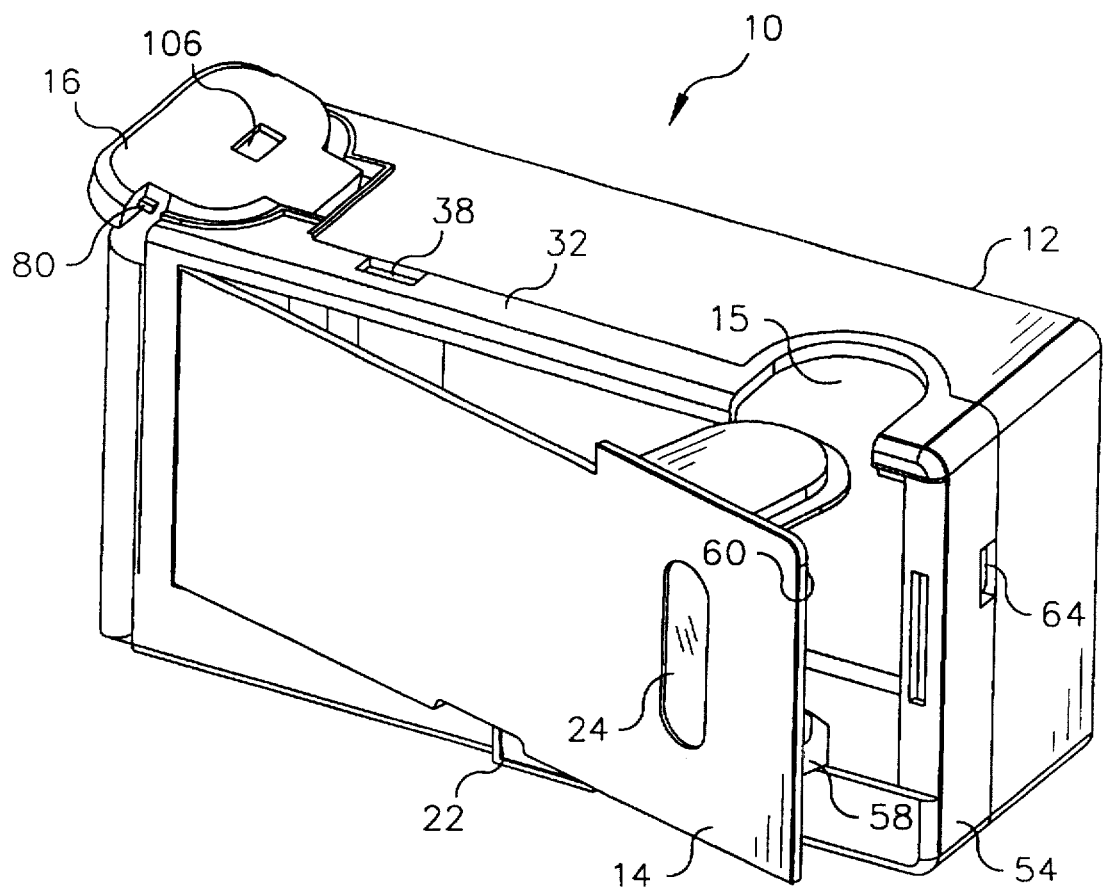
FIG. 1 is an upside down rear perspective view of a rental camera which is a preferred embodiment of the invention.

Referring now to the drawings, FIG. 1 is an upside down rear front perspective view of a rental camera 10. The rental camera 10 is to be used by a customer for picture-taking, and then is to be returned to a lender (supplier) to unload exposed film and replace with fresh film.

Figure 6:
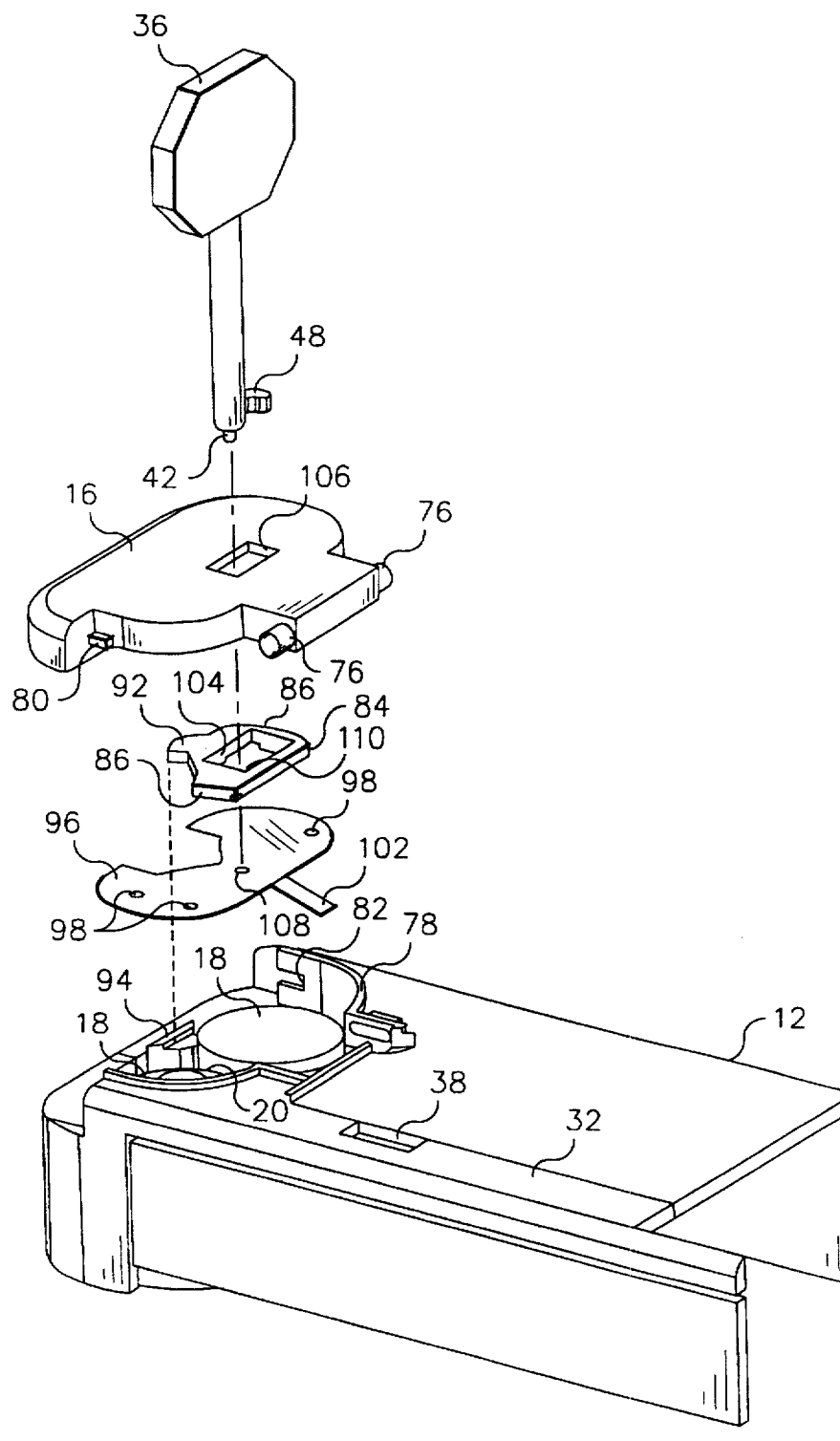

As shown in FIGS. 1 and 6, the rental camera 10 includes a camera body 12 having a rear film door 14 that is to be opened by the lender in order to remove a 35 mm film cartridge (not shown) with exposed film from a cartridge chamber 15 and replace the cartridge with another one containing fresh film. A separate battery door 16 of the rental camera 10 is to be opened by the lender in order to remove a pair of exhausted batteries 18, 18 from a battery chamber 20 and insert a pair of fresh batteries 18, 18 into the battery chamber. The rear of the camera body 12 has a rear viewfinder opening 22 and a cartridge window 24 for viewing the film cartridge loaded in the camera body.

Figure 2:
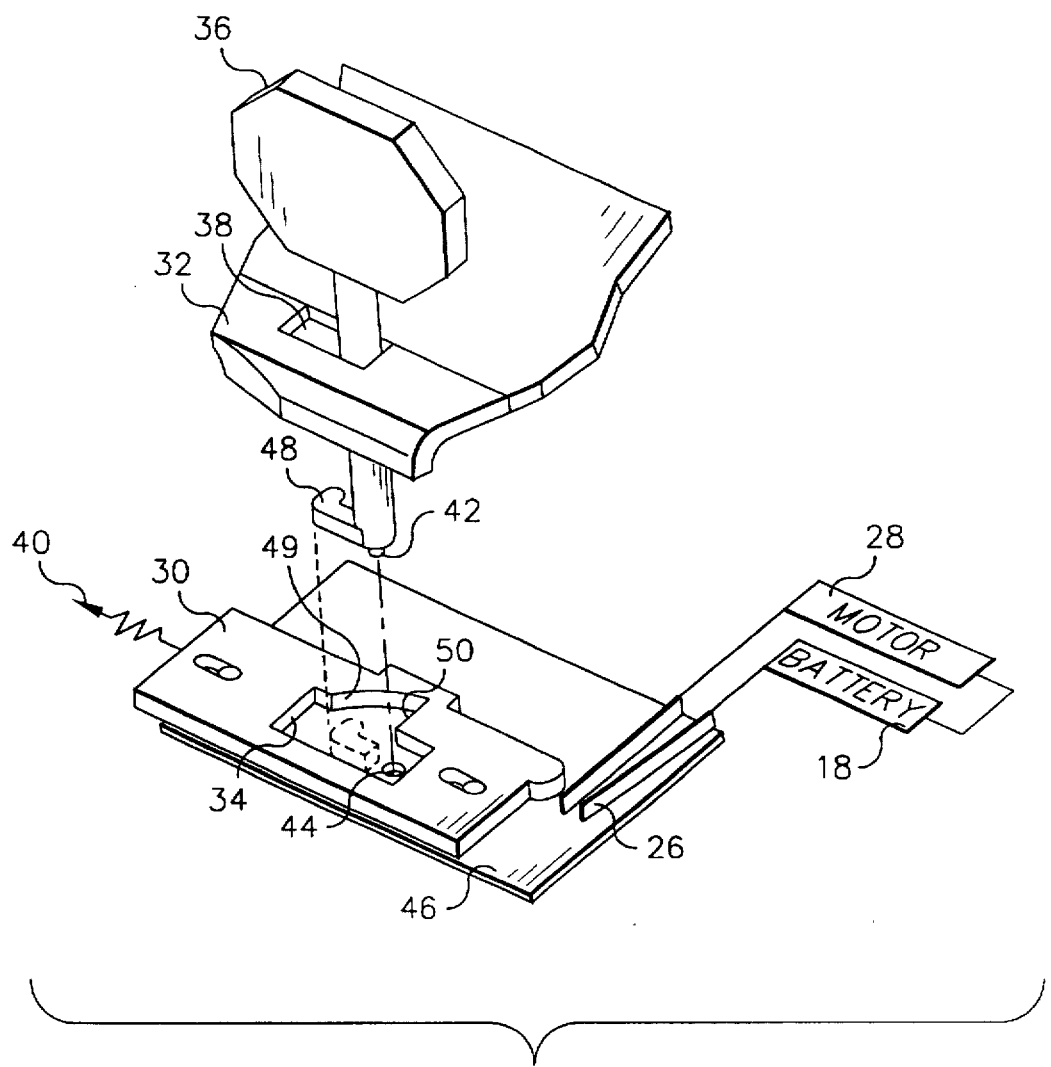
FIGS. 2 and 3 are exploded perspective views of a film rewind mechanism of the rental camera and an auxiliary key for operating the film rewind mechanism.
Figure 3:
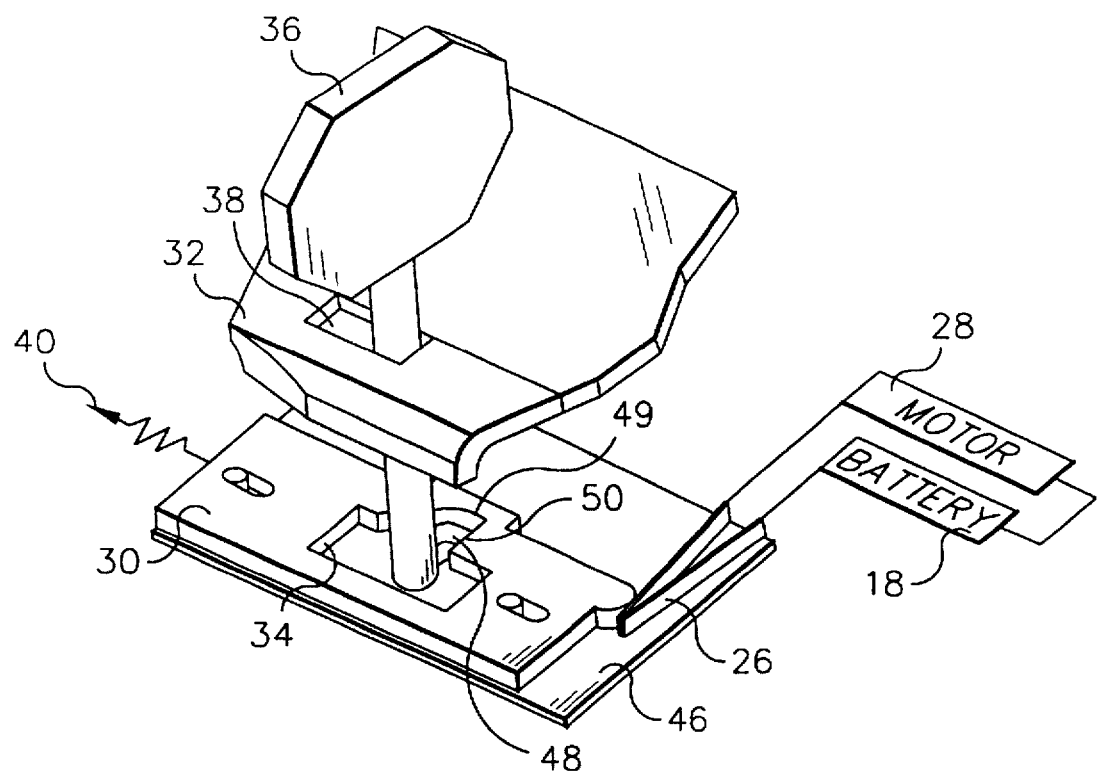

As shown in FIGS. 2 and 3, a biased-open reed switch 26 inside the camera body 12 is adapted to be closed to connect a motor 28 inside the camera body to the pair of batteries 18 in the battery chamber 20. When the pair of batteries 18 and the motor 28 are connected, the motor is powered to rewind exposed film into the film cartridge in a known manner. The exposed film must be rewound into the film cartridge before the film cartridge is removed from the cartridge chamber 15. An internal rewind-triggering slide 30 beneath an exterior housing portion 32 of the camera body 12 has a central key-hole 34 for receiving an auxiliary key 36 when the auxiliary key is inserted through a through-hole 38 in the exterior housing portion. A return spring 40 normally maintains the slide 30 in an idle position shown in FIG. 2. When the rental camera 10 is returned to the lender to unload exposed film and replace with fresh film, the lender first inserts the auxiliary key 36 through the through-hole 38 and into the key-hole 34, and locates a forward end 42 of the auxiliary key in a pivot or support hole 44 in a fixed support plate 46 beneath the key-hole. The lender then turns the auxiliary key 36 clockwise 90 degrees in FIG. 2. See FIG. 3. This moves an actuating protuberance 48 of the auxiliary key 36 into an offset portion 49 of the key-hole 34 and against an engageable straight edge 50 of the slide 30 to translate the slide to the right in FIG. 3 to an active film-rewind position against the reed switch 26, in order to close the reed switch to initiate rewind of exposed film into the film cartridge.

Figure 4:
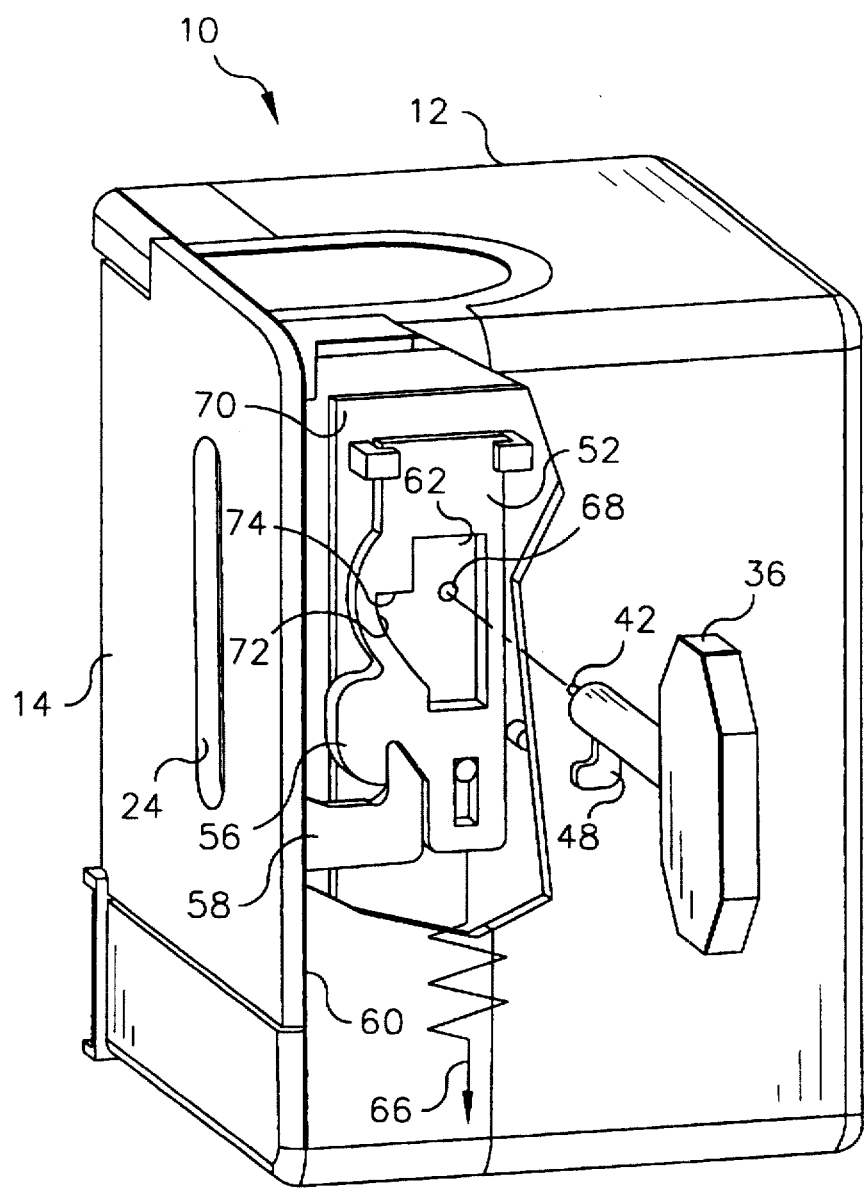
FIGS. 4 and 5 are exploded perspective views of a film door locking mechanism of the rental camera and an auxiliary key for operating the film door locking mechanism.
Figure 5:
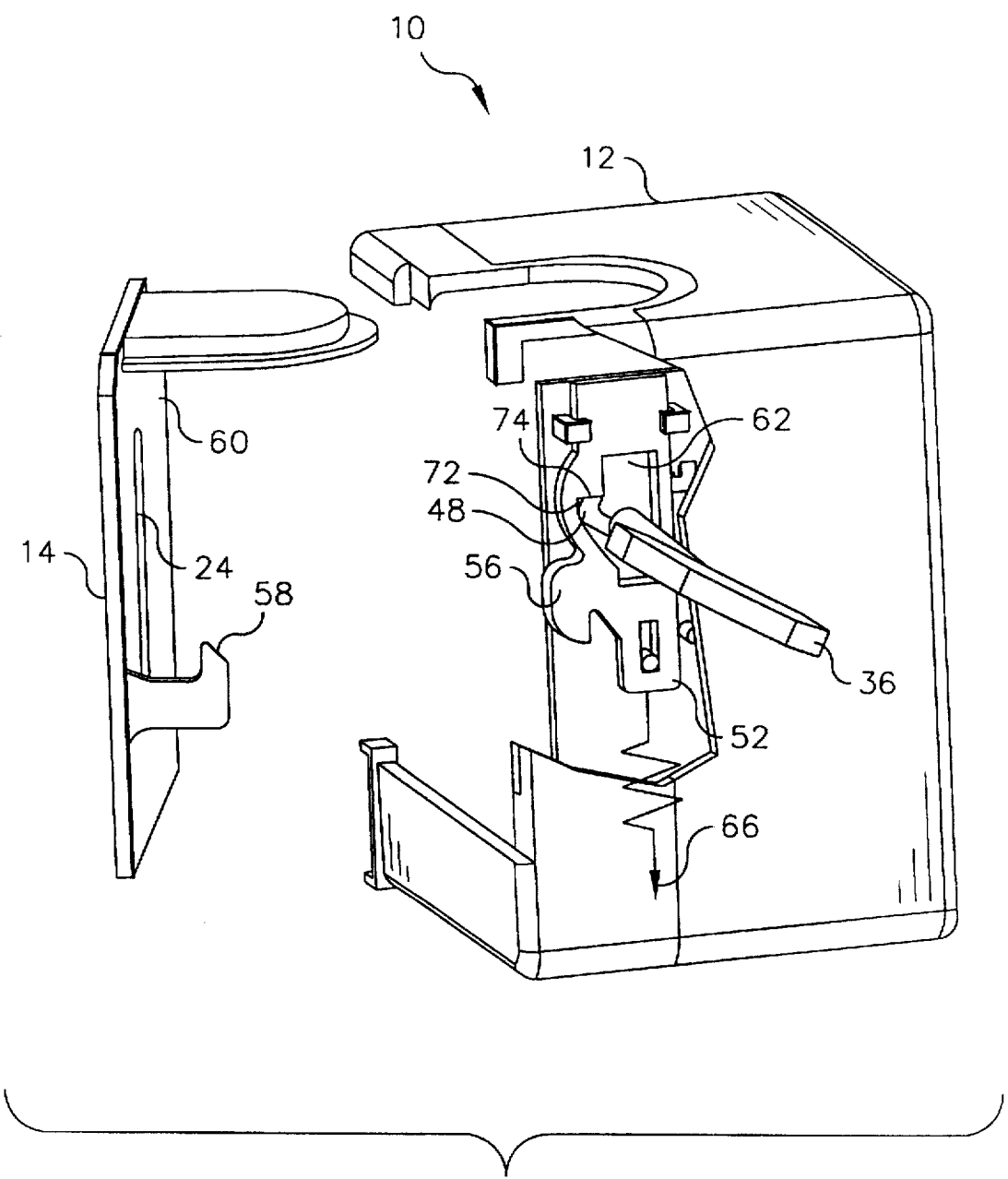

As shown in FIGS. 1, 4 and 5, an internal latching slide 52 beneath an exterior housing portion 54 of the camera body 12 has a latching hook 56 that is adapted to mate with a complementary hook 58 projecting from an inner side 60 of the film door 14, to hold the film door closed and prevent removal of the film cartridge from the cartridge chamber 15. The slide 52 has a central key-hole 62 for receiving the auxiliary key 36 when the auxiliary key is inserted through a through-hole 64 in the exterior housing portion 54 A return spring 66 normally maintains the slide 52 in a locking position shown in FIG. 4 (in which the two hooks 56 and 58 are mutually engaged). When the rental camera 10 is returned to the lender to unload exposed film and replace with fresh film, the lender first inserts the auxiliary key 36 through the through-hole 64 and into the key-hole 62, and locates the forward end 42 of the auxiliary key in a pivot or support hole 68 in a fixed support plate 70 beneath the key-hole. The lender then turns the auxiliary key 36 clockwise 135 degrees in FIG. 4. See FIG. 5. This moves the actuating protuberance 48 of the auxiliary key 36 into an offset portion 72 of the key-hole 62 and against an engageable straight edge 74 of the slide 52 to translate the slide up in FIG. 5 to an unlocking position. In the unlocking position, the hook 56 is separated from the hook 58 to permit the film door 14 to be opened to remove the film cartridge from the cartridge chamber 15.

As shown in FIGS. 6 and 7, the battery door 16 has a pair of coaxial pivot pins 76, 76 that are located in respective closed-end slots 78 (only one shown) in the camera body 12 and a pair of hold-down studs 80, 80 that are to be longitudinally inserted into respective open-end slots 82 (only one shown) in the camera body. To open the battery door 16, in order to remove the pair of exhausted batteries 18, 18 from the battery chamber 20 and insert a pair of fresh batteries 18, 18 into the battery chamber, the battery door must first be slid to the left in FIG. 6 to remove the studs 80 from the slots 82 and then be pivoted clockwise open in FIG. 6. A latching member 84 has a pair of curved bearing edges 86, 86 that are rotationally captured by respective curved bearing ribs 88, 88 on an inner side 90 of the battery door 16 to support the latching member for rotatable movement between a latching position and a free position. In the latching position, a latch tab 92 of the latching member 84 abuts a blocking tab 94 of the camera body 12 to prevent the battery door 16 from being slid to the left in FIG. 6 to remove the studs 80 from the slots 82. In the free position, the latching member 84 is rotated 45 degrees clockwise in FIG. 6 from its latching position to swing the latch tab 92 clear of the blocking tab 94 to permit the battery door to be slid to the left in FIG. 6 to remove the studs 80 from the slots 82. Then, the battery door 16 can be pivoted clockwise in FIG. 6 to open the battery door. An electrically conductive, resilient contact plate 96 has three holes 98, 98, 98 that contain respective support pins 100, 100, 100 on the inner side of the battery door 16 and a spring extension 102 that urges the battery door open. See FIG. 7. The contact plate 96 is located between the latching member 84 and the battery chamber 20, and bridges negative and positive ends of the respective batteries 18. The latching member 84 has a central key-hole 104 for receiving the auxiliary key 36 when the auxiliary key is inserted through a through-hole 106 in the battery door 16. When the rental camera 10 is returned to the lender to unload exposed film and replace with fresh film, the lender inserts the auxiliary key 36 through the through-hole 106 and into the key-hole 104, and locates the forward end 42 of the auxiliary key in a pivot or support hole 108 in the contact plate 96. The lender then turns the auxiliary key 36 clockwise 45 degrees in FIG. 6. This moves the actuating protuberance 48 of the auxiliary key 36 within the key-hole 104 against an engageable straight edge 110 of the latching member 84 to rotate the latching member clockwise in FIG. 6 from its latching position to its free position.

The invention has been described with reference to a preferred embodiment. However, it will be appreciated that variations and modifications can be effected by a person of ordinary skill in the art without departing from the scope of the invention. For example, the complementary hook 58 projecting from the inner side 60 of the rear film door 14 in FIGS. 4 and 5 can be made sufficiently resilient for the actuating protuberance 48 of the auxiliary key 36 to directly flex the complementary hook out of engagement with the latching hook 56 of the camera body 12 when the auxiliary key is turned. In this instance, the latching slide 52 would not be necessary. Similarly, in FIGS. 2 and 3, the rewind-triggering slide could be eliminated, and the auxiliary key 36 could be used to directly close the reed switch 26.

PARTS LIST 10. rental camera
12. camera body
14. rear film door
15. cartridge chamber
16. battery door
18. batteries
20. battery chamber
22. rear viewfinder opening
24. cartridge window
26. reed switch
28. motor
30. rewind-triggering slide
32. exterior housing portion
34. key-hole
36. auxiliary key
38. through-hole
40. return spring
42. forward end
44. pivot or support hole
46. support plate
48. actuating protuberance
49. offset portion
50. engageable straight edge
52. latching slide
54. exterior housing portion
56. latching hook
58. complementary hook
60. inner side
62. key-hole
64. through-hole
66. return spring
68. pivot or support hole
70. support plate
72. offset portion
74. engageable straight edge
76. pivot pins
78. closed-end slots 80. hold-down studs
82. open-end slots
84. latching member
86. bearing edges
88. bearing ribs
90. inner side
92. latch tab
94. blocking tab
96. contact plate
98. holes
100. support pins
102. spring extension
104. key-hole
106. through-hole
108. pivot or support hole
110. engageable straight edge

What is claimed is:

1. A rental camera to be used by a customer for picture-taking, and intended to be returned to a lender to unload exposed film and replace with fresh film, said rental camera comprising:

a camera body having an exterior-to-interior through-hole, and including a door that is to be opened to unload exposed film and replace with fresh film; and operable means supported within said camera body for movement between a first position for deterring unloading exposed film and replacing with fresh film and a second position for not deterring unloading exposed film and replacing with fresh film, and including a movable latching member which in the first position of said operable means latches said door closed to prevent exposed film from being unloaded and replaced with fresh film and in the second position of said operable means unlatches the door to permit the door to be opened to unload exposed film and replace with fresh film and which has a key-hole for receiving an auxiliary key, and including an engageable portion accessible via said through-hole when said operable means is in said first position and located in said key-hole for the auxiliary key to engage when the operable means is in the first position to move said latching member with said operable means to said second position when the auxiliary key is rotated.

2. A rental camera to be used by a customer for picture-taking, and intended to be returned to a lender to unload exposed film and replace with fresh film, said rental camera comprising:

a camera body having an exterior-to-interior through-hole; and operable means supported within said camera body for movement between a first position for deterring unloading exposed film and replacing with fresh film and a second position for not deterring unloading exposed film and replacing with fresh film, and including a two-state switch constructed to change its state to initiate film rewind, a rewind trigger which is movable from said first position to said second position to change the state of said switch and which has a key-hole for receiving the auxiliary key, and an engageable portion accessible via said through-hole when said operable means is in said first position for an auxiliary key to engage said engageable portion to move said operable means to the second position when the auxiliary key is rotated and located in said key-hole for the auxiliary key to engage the engageable portion to move said rewind trigger from the first position to the second position when the auxiliary key is rotated.

3. A camera comprising:

a camera body having a chamber, and including a door that can be opened to uncover said chamber and which has a through-hole;

a latching member supported on an inner side of said door over said through-hole for movement from a first position latching the door closed and a second position unlatching the door to permit the door to be opened, and which has a key-hole opposite said through-hole for receiving an auxiliary key inserted through the through-hole when said latching member is in the first position and an engageable portion located in said key-hole for the auxiliary key to engage to move said latching member from the first position to the second position to unlatch said door when the auxiliary key is rotated in said key-hole;

and said latching member has a pair of curved bearing edges, and said door has a pair of curved bearing ribs which are located against said respective bearing edges to support said latching member for rotation from said first position to said second position.

4. A camera comprising:

a camera body having a chamber, and including a door that can be opened to uncover said chamber and which has a through-hole:

a latching member supported on an inner side of said door over said through-hole for movement from a first position latching the door closed and a second position unlatching the door to permit the door to be opened, and which has a key-hole opposite said through-hole for receiving an auxiliary key inserted through the through-hole when said latching member is in the first position and an engageable portion located in said key-hole for the auxiliary key to engage to move said latching member from the first position to the second position to unlatch said door when the auxiliary key is rotated in said key-hole; and an electrically conductive resilient contact located over said key-hole in the latching member and between said latching member and said chamber, and said latching member holds said contact against at least one battery in said chamber when the latching member is in said first position and allows said contact to urge said door open when said latching member is moved to said second position to unlatch the door.

5. A camera as recited in claim 4, wherein said contact has a support hole for rotationally supporting one end of the auxiliary key to facilitate rotation of the auxiliary key in said key-hole to move said latching member from the first position to the second position.

* * * * *